AMPLIFIERS

Filed Dec. 24, 1953 2 Sheets-Sheet 1

Oct. 8, 1957 G. F. PITTMAN, JR 2,809,343

AMPLIFIERS

Filed Dec. 24, 1953 2 Sheets-Sheet 2

WITNESSES

INVENTOR
George F. Pittman Jr.
BY
ATTORNEY 2,809,343
Patented Oct. 8, 1957

2,809,343

AMPLIFIERS

George F. Pittman, Jr., Pittsburgh, Pa., assignor to Westinghouse Electric Corporation, East Pittsburgh, Pa., a a corporation of Pennsylvania Application December 24, 1953, Serial No. 400,227

8 Claims. (Cl. 323—89)

This invention relates to stationary induction apparatus and, more particularly, to magnetic amplifiers.

In the magnetic amplifier field, the effectiveness of the magnetic amplifier is determined by its figure of merit which is the ratio of its power gain to its overall response time. Although many of the prior art magnetic amplifiers can be constructed so as to have a fairly high speed of response, yet this speed of response is at the sacrifice of power gain. That is, even though the prior art magnetic amplifier can be constructed so as to have a relatively high speed of response, the figure of merit for the prior art magnetic amplifier remains the same since the power gain decreases with an increase in response time.

An object of this invention is to provide a magnetic amplifier having a high figure of merit.

Another object of this invention is to provide a magnetic amplifier that has a high speed of response and yet has a relatively high power gain, by so incorporating a transistor in a magnetic amplifier circuit that the voltage induced across the control winding of the magnetic amplifier serves as the supply voltage for the transistor, and that another control winding of the magnetic amplifier in cooperation with the first control winding determines the flux level to which the magnetic core means is reset to thereby control the magnitude of the output voltage of the magnetic amplifier.

A further object of this invention is to provide a magnetic amplifier that has a high speed of response and yet has a relatively high power gain, as well as a substantially linear output characteristic.

Still another object of this invention is to provide a magnetic amplifier of minimum size and weight that has a high figure of merit.

Other objects of this invention will become apparent from the following description when taken in conjunction with the accompanying drawings, in which.

Figure 1:
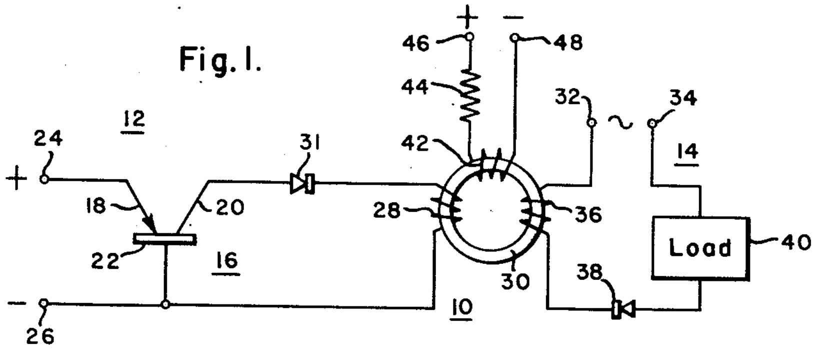
Figure 1 is a schematic diagram of a half-wave magnetic amplifier illustrating this invention and in which a P-N-P type junction transistor is incorporated as a control element.

Referring to Fig. 1, there is shown a half-wave magnetic amplifier 10 illustrating this invention. In general, the magnetic amplifier 10 comprises an input or control circuit 12 and an output or load circuit 14. The control circuit 12 includes a P-N-P type junction transistor 16, having an emitter 18, a collector 20, and a base 22.

The impedance between the collector 20 and the base 22, of the transistor 16, is controlled in accordance with the magnitude of the direct-current control voltage applied to control terminals 24 and 26. Since the transistor 16 is of the P-N-P junction type, the control terminal 24 is at a positive polarity with respect to the control terminal 26. In this instance, the circuit means for applying the control voltage between the emitter 18 and the base 22 comprises a conductor connected between the control terminal 24 and the emitter 18, and another conductor connected between the control terminal 26 and the base 22 of the transistor 16.

As illustrated, the control circuit 12 also includes a control winding 28 which is disposed in inductive relationship with a magnetic core member 30. In order to render the control winding 28 responsive to the magnitude of the direct-current control voltage applied to the terminals 24 and 26, the control winding 28 is interconnected with the collector 20 and the base 22 of the transistor 16. Specifically, one end of the control winding 28 is connected to the base 22, and the other end of the control winding 28 is connected to the collector 20 through a control circuit rectifier 31, the function of which will be described hereinafter.

In order to drive the magnetic core member 30 to a substantially complete magnetic saturation during alternate half-cycles of the supply voltage applied to the supply terminals 32 and 34, a load winding 36 is disposed in inductive relationship with the magnetic core member 30. In particular, the load winding 36 is connected in series circuit relationship with a load circuit rectifier 38 and with a load 40, the series circuit being connected across the supply terminals 32 and 34. Thus, when the supply terminal 34 is at a positive polarity with respect to the supply terminal 32, load current flows through the load 40, the rectifier 38, and the load winding 36, to the supply terminal 32. Such a current flow effects a substantially complete magnetic saturation of the magnetic core member 30. However, during the next half-cycle of the supply voltage, when the terminal 32 is at a positive polarity with respect to the terminal 34, current flow through the load winding 36 is blocked by the rectifier 38.

When the supply terminal 34 is at a positive polarity with respect to the supply terminal 32, the current flow through the load winding 36 effects an induced voltage across the control winding 28. However, this induced voltage across the control winding 28 is blocked by the control circuit rectifier 31, thereby preventing damage to the transistor 16. If the control circuit rectifier 31 were not provided, the control winding 28 would act as a short-circuit winding on the core member 30, and the alternating-current applied to the supply terminals 32 and 34 could not effect a substantially complete magnetic saturation of the magnetic core member 30.

For the purpose of driving the magnetic core member 30 away from saturation, during the other half-cycle of the supply voltage, as applied to the terminals 32 and 34, when the load winding 36 is deenergized, a biasing winding 42 is disposed in inductive relationship with the magnetic core member 30. Specifically, the biasing winding 42 is connected in series circuit relationship with a current limiting impedance or resistor 44, the series circuit being connected across the terminals 46 and 48, which have applied thereto a substantially constant direct-current voltage. As illustrated, the terminal 46 is at a positive polarity with respect to the terminal 48. In operation, the function of the current limiting resistor 44 is to prevent the flow of induced currents in the biasing circuit due to the alternate energization of the load winding 36.

When the current flow through the biasing winding 42 drives the magnetic core member 30 away from saturation, the change in flux in the core member 30 induces a voltage across the control winding 28, which induced voltage functions as a supply voltage for the transistor 16. Therefore, by varying the magnitude of the control voltage applied to the terminals 24 and 26, the magnitude of the induced control current flowing in the output circuit of the transistor 16 can be varied.

As illustrated, the biasing winding 42 is so disposed on the magnetic core member 30 and interconnected with the terminals 46 and 48 that current flow therethrough produces a flux in the core member 30 that opposes the flux produced by the current flow through the load winding 36. However, the control winding 28 is so disposed on the magnetic core member 30 and interconnected with the collector 20 and base 22, of the transistor 16, that the induced current flow therethrough, as hereinbefore explained, effects a flux in the magnetic core member 30 that opposes the flux produced by the current flow through the biasing winding 42, during the alternate reset portions of the operation when the load winding 36 is deenergized. Thus, the control winding 28 and the biasing winding 42 cooperate to determine the flux level to which the magnetic core member 30 is reset during the alternate portions of the operation when the load winding 36 is deenergized. Then, during the alternate half-cycles of the supply voltage, as applied to the terminals 32 and 34, when the load winding 36 is energized, the current flow through the load winding 36 effects a driving of the magnetic core member 30 to a substantially complete magnetic saturation.

In practice, taking into consideration only the current flow through the biasing winding 42, the magnitude of this current flow is sufficient to bias the magnetic core member 30 to cut off. Thus, in the extreme case of zero control voltage across the terminals 24 and 26, or in other words, zero emitter current, the transistor 16 exhibits a very high impedance between its base 22 and its collector 20. Under such conditions, the flow of induced current through the control winding 28 is essentially prevented, and thus the magnetic core member 30 resets fully under the action of the current flow through the biasing winding 42. Therefore, a minimum of output voltage appears across the load 40 when the control voltage across the terminals 24 and 26 is of zero magnitude.

In the other extreme, if the control voltage and thus the emitter current is such as to effect a transistor collector current equal to or slightly greater than the biasing current flowing through the biasing winding 42, reduced to the control winding turns base, the transistor will appear as a very low impedance across the control winding 28, and induced current will freely flow through the control winding 28. Under this condition, the magnetic core member 30 will act as a current transformer during the resetting half-cycle of the operation, and a current will flow in the control winding 28 equal and opposite to the biasing current on a common turns base. The net controlling magnetomotive force is thus zero, and the magnetic core member 30 does not reset at all; full output voltage is thus obtained across the load 40.

Figure 4:
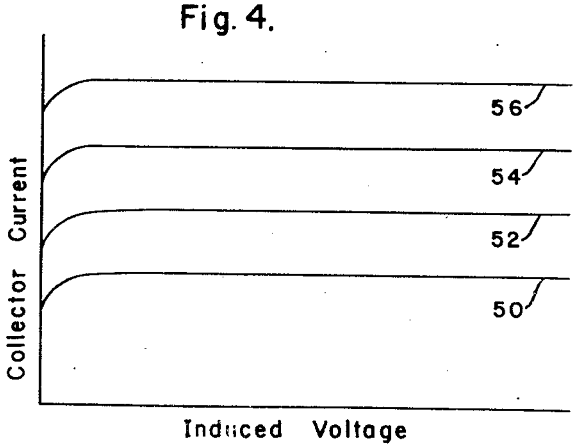
Fig. 4 is a graph illustrating the characteristic curves of the transistor shown in Fig. 1.

Referring to Fig. 4, there is illustrated characteristic curves for the transistor 16 of Fig. 1. In particular, a curve 50 illustrates the manner in which the collector current of the transistor 16 varies with changes in the magnitude of the induced voltage across the control winding 28, for a given emitter current or control voltage applied to the terminals 24 and 26. As can be seen from the curve 50, changes in the magnitude of the induced voltage across the control winding 28, which functions as the supply voltage for the transistor 16, do not change the magnitude of the collector current for the transistor 16. Therefore, even though the magnitude of the induced voltage across the control winding 28 varies, this variation does not affect the operation of the magnetic amplifier 10. Since any such variation does not affect the operation of the magnetic amplifier 10, its output, as it appears across the load 40, has a substantially linear characteristic. It is to be noted, that if changes in the magnitude of the induced voltage across the control winding 28 were to affect the magnitude of the collector current, the output from the magnetic amplifier 10 would not be as linear.

The remaining curves 52, 54 and 56, illustrated in Fig. 4, represent the manner in which the collector current for the transistor 16 varies with changes in the magnitude of the induced voltage across the control winding 28 for increasing magnitudes of the control voltage applied to the terminals 24 and 26.

Figure 2:
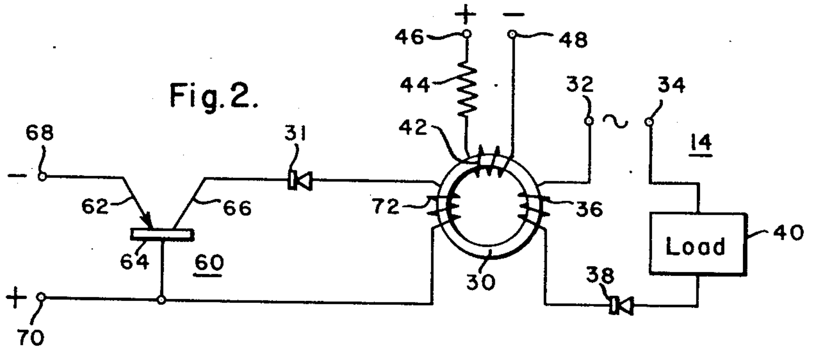
Fig. 2 is a schematic diagram of another half-wave magnetic amplifier illustrating this invention and in which an N-P-N type junction transistor is incorporated as a control element.

Referring to Fig. 2, there is illustrated another embodiment of the teachings of this invention in which like components of Figs. 1 and 2 have been given the same reference characters. The main distinction between the apparatus illustrated in Figs. 1 and 2 is that in the apparatus of Fig. 2 an N–P–N type junction transistor 60 is utilized instead of the P–N–P type junction transistor 16 illustrated in Fig. 1.

As illustrated, the transistor 60 comprises an emitter 62, a base 64, and a collector 66. The direct-current control voltage for the transistor 60 is applied to control terminals 68 and 70. In particular, the direct-current control voltage is applied between the emitter 62 and the base 64 by connecting the terminal 68 to the emitter 62, and by connecting the terminal 70, which is at a positive polarity with respect to the terminals 68, to the base 64 of the transistor 60.

In order to render the magnetic core member 30 of Fig. 2 responsive to the magnitude of the direct-current control voltage applied to the terminals 68 and 70, a control winding 72 is disposed in inductive relationship with the magnetic core member 30. As can be seen from the drawings, the control winding 72 of Fig. 2 is wound oppositely from the control winding 28 illustrated in Fig. 1. Therefore, the direction of the control circuit rectifier 31 illustrated in Fig. 2 is reversed from that of the control circuit rectifier 31 illustrated in Fig. 1. Since the control winding 72, the biasing winding 42, and the load winding 36 of the apparatus of Fig. 2, cooperate in the same way as do the control winding 28, the biasing winding 42 and the load winding 36 of the apparatus of Fig. 1, a further description of the operation of the apparatus of Fig. 2 is deemed unnecessary.

Figure 3:
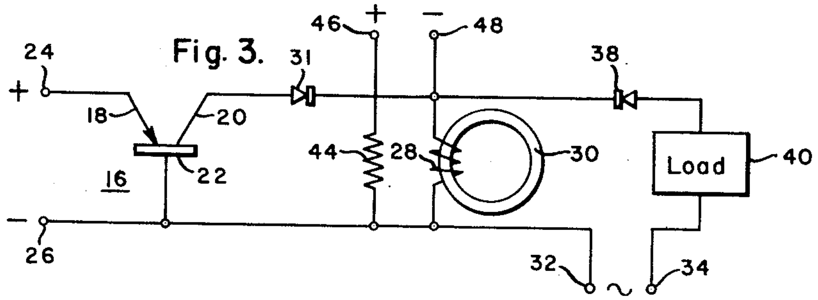
Fig. 3 is a schematic diagram of still another half-wave magnetic amplifier illustrating this invention and in which a single reactor winding functions as the control winding, the biasing winding, and the load winding.

Referring to Fig. 3, there is illustrated still another embodiment of the teachings of this invention in which like components of Figs. 1 and 3 have been given the same reference characters. The main distinction between the apparatus of Figs. 1 and 3 is that in the apparatus of Fig. 3 the various components are so connected to the control or reactor winding 28 that it functions as a control winding, a biasing winding, and a load winding. In order to substantially completely saturate the magnetic core member 30 during alternate half-cycles of the supply voltage applied to the terminals 32 and 34, the terminal 34 is connected to the upper end of the control winding 28, as shown, through the load 40 and the load circuit rectifier 38. On the other hand, the supply terminal 32 is connected to the lower end of the winding 28, as shown.

For the purpose of driving the magnetic core member 30 away from saturation, during the reset portions of the operation, when the supply terminal 32 is at a positive polarity with respect to the supply terminal 34, the terminal 46 is connected to the lower end of the control winding 28, as shown, through the current limiting resistor 44, and the terminal 48 is connected to the upper end of the winding 28, as shown.

The operation of the magnetic amplifier illustrated in Fig. 3 will now be described. When the supply terminal 34 is at a positive polarity with respect to the supply terminal 32, current flows from the terminal 34 through the load 40, the load circuit rectifier 38 and the winding 28, to the terminal 32. This current flow effects a substantially complete magnetic saturation of the magnetic core member 30. During the next half-cycle of the supply voltage, when the supply terminal 32 is at a positive polarity with respect to the supply terminal 34, current flows from the terminal 46 through the current limiting resistor 44 and the winding 28, to the terminal 48. This biasing current is opposed by the transistor collector current, to thereby provide a resultant current flow through the winding 28 which determines the flux level to which the magnetic core member 30 is reset during this reset portion of the operation.

During the next half-cycle of the supply voltage, when the supply terminal 34 is again at a positive polarity with respect to the supply terminal 32, current flows from the terminal 34 through the load 40, the load circuit rectifier 38, and the winding 28, to the supply terminal 32. This load current effects a substantially complete magnetic saturation of the magnetic core member 30, the magnitude of the voltage across the load 40 being determined by the flux level to which the magnetic core member 30 has been reset on the previous half-cycle of the supply voltage, as applied to the terminals 32 and 34. Since the remainder of the components of the magnetic amplifier illustrated in Fig. 3 perform the same function as they do in the magnetic amplifier 10 of Fig. 1, a further description of the operation of the magnetic amplifier of Fig. 3 is deemed unnecessary.

Figure 5:
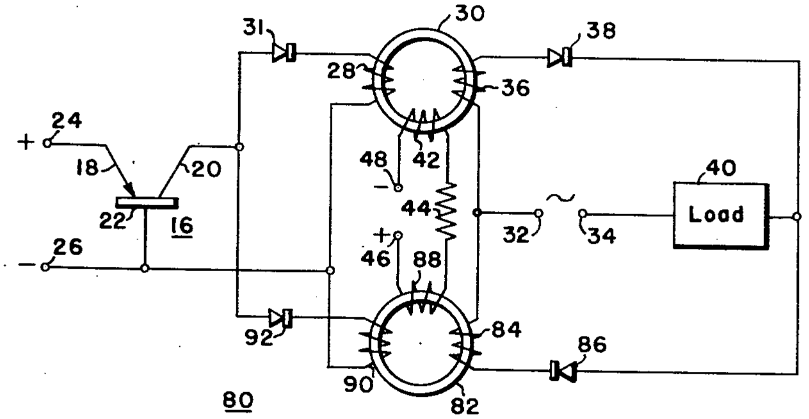
Fig. 5 is a schematic diagram of a doubler-type, full-wave magnetic amplifier illustrating this invention.

Referring to Fig. 5, there is illustrated a doubler-type, full-wave magnetic amplifier 80 in which like components of Figs. 1 and 5 have been given the same reference characters. In order to provide a full-wave output across the load 40, a magnetic core member 82, corresponding to the magnetic core member 30, is provided. For the purpose of substantially completely saturating the magnetic core member 82, on alternate half-cycles of the supply voltage, as applied to the terminals 32 and 34, a load winding 84 is disposed in inductive relationship with the magnetic core member 82. Specifically, one end of the load winding 84 is connected to the supply terminal 34 through a load circuit rectifier 86, and the load 40. The rectifier 86 functions to block the current flow through the load winding 84 when the supply terminal 32 is at a positive polarity with respect to the supply terminal 34.

On the other hand, one end of the load winding 36 is connected to the supply terminal 34 through the load circuit rectifier 38 and the load 40, the supply terminal 32 being connected to the other two ends of the load windings 36 and 84. In this instance, the rectifier 38 functions to block the current flow through the load winding 36 when the supply terminal 34 is at a positive polarity with respect to the supply terminal 32.

In order to drive the magnetic core member 82 away from saturation, when the load winding 84 is deenergized, a biasing winding 88 is disposed in inductive relationship with the magnetic core member 82. In this instance, the biasing windings 42 and 88 receive a substantially constant current flow from the terminals 46 and 48, which have applied thereto a substantially constant direct-current voltage. In Fig. 5, the current limiting resistor 44 functions to prevent the flow of induced currents in the biasing circuit due to the energization of the load windings 36 and 84.

A control winding 90, corresponding to the control winding 28, is disposed in inductive relationship with the magnetic core member 82. The control winding 90 is responsive to the magnitude of the direct-current control voltage, as applied to the control terminals 24 and 26. In particular, one end of the control winding 90 is connected to the collector 20 of the transistor 16 through a control circuit rectifier 92, while the other end of the control winding 90 is connected to the base 22 of the transistor 16. The function of the rectifier 92 is to block the induced voltage appearing across the control winding 90 when the load winding 84 is energized for effecting a substantially complete magnetic saturation of the core member 82. As hereinbefore mentioned, if such an induced voltage were allowed to effect a current flow through the transistor 16, damage would be done to the transistor. Further, if the rectifier 92 were not so connected to block this induced voltage across the control winding 90, when the load winding 84 is energized, the control winding 90 would act as a short-circuit winding on the magnetic core member 82 and thus prevent the current flow through the load winding 84 from effecting a substantially complete magnetic saturation of the core member 82.

As illustrated, the control winding 90 is so disposed on the magnetic core member 82 and is so connected to the output of the transistor 16, that the current flow therethrough produces a flux in the magnetic core member 82 that opposes the flux produced in the core member 82 by the current flow through the biasing winding 88. Thus, the control winding 90 and the biasing winding 88 cooperate to control the flux level to which the magnetic core member 82 is reset, during the reset portion of the cycle for the core member 82, when the supply terminal 32 is at a positive polarity with respect to the supply terminal 34.

The operation of the full-wave doubler type magnetic amplifier illustrated in Fig. 5 will now be described. Assuming the supply terminal 32 is at a positive polarity with respect to the supply terminal 34, current flows from the terminal 32 through the load winding 36, the rectifier 38, and the load 40 to the terminal 34. Such an action effects a substantially complete magnetic saturation of the magnetic core member 30. As hereinbefore explained, the magnitude of the voltage that appears across the load 40 during this half-cycle of the supply voltage, is determined by the flux level to which the magnetic core member 30 has been reset on the previous half-cycle of the supply voltage.

During the same half-cycle of the supply voltage, when the supply terminal 32 is at a positive polarity with respect to the supply terminal 34, the flux level in the magnetic core member 82 is reset to a value as determined by the magnitude of the current flowing through the control winding 90 and the biasing winding 88.

An increase in the magnitude of the direct-current control voltage across the terminals 24 and 26 effects an increase in the magnitude of the current flow through the control winding 90. The increase in current flow through the control winding 90 effects a resetting of the flux level in the magnetic core member 82 to a higher level, and, therefore, during the half-cycle of the supply voltage when the load winding 84 is energized, the magnitude of the voltage appearing across the load 40 is increased. Of course, an increase in the magnitude of the control voltage across the terminals 24 and 26 would likewise increase the magnitude of the current flow through the control winding 28 and thus would effect an increase in the magnitude of the voltage appearing across the load 40 when the load winding 36 is energized.

During the next half-cycle of the supply voltage, when the terminal 34 is at a positive polarity with respect to the terminal 32, current flows from the terminal 34 through the load 40, the load circuit rectifier 86, and the load winding 84, to the terminal 32. Such an action effects a substantially complete magnetic saturation of the magnetic core member 82, the magnitude of the voltage appearing across the load 40 during this portion of the operation being determined, as hereinbefore explained, by the magnitude of the current flow through the control winding 90 and the biasing winding 88. When the supply terminal 34 is at a positive polarity with respect to the supply terminal 32, the flux level in the magnetic core member 30 is reset to a value as determined by the magnitude of the current flow through the control winding 28 and the biasing winding 42. Thus, when the magnetic core member 82 is being driven to saturation, the flux level in the magnetic core member 30 is being reset. On the other hand, when the magnetic core member 30 is being driven to saturation, the flux level in the magnetic core member 82 is being reset to a predetermined value.

Figure 6:
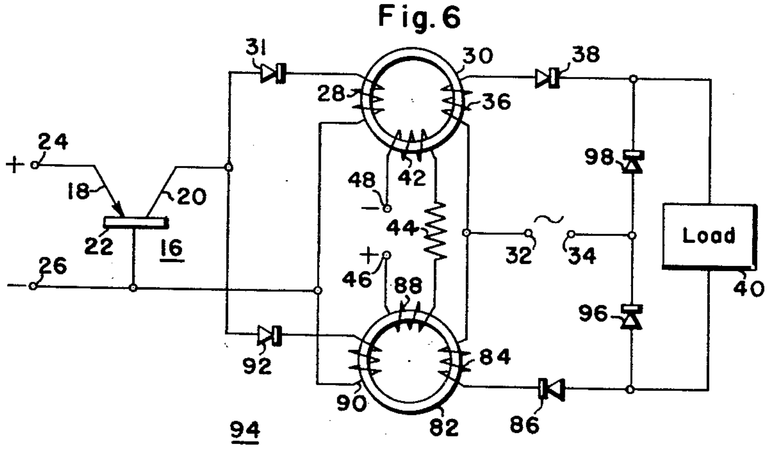
Fig. 6 is a schematic diagram of a bridge-type, full-wave magnetic amplifier illustrating this invention.

Referring to Fig. 6, there is illustrated a bridge-type, full-wave magnetic amplifier 94 in which like components of Figs. 5 and 6 have been given the same reference characters. The main distinction between the magnetic amplifier 94 and the magnetic amplifier 80 is that in the magnetic amplifier 94 the output circuit has been modified in order to provide a direct-current voltage across the load 40. In particular, a load circuit rectifier 96 is connected between the rectifier 86 and the supply terminal 84, and a load circuit rectifier 98 is connected between the load circuit rectifier 38 and the supply terminal 34. As illustrated, the load 40 is connected across the series-connected load rectifiers 96 and 98.

In operation, when the supply terminal 32 of Fig. 6 is at a positive polarity with respect to the supply terminal 34, current flows from the terminal 32 through the load winding 36, the load circuit rectifier 38, the load 40, and the load circuit rectifier 96, to the terminal 34. Such an action effects a substantially complete magnetic saturation of the magnetic core member 30, and during this same half-cycle of the supply voltage, the flux level in the magnetic core member 82 is reset to a predetermined value. During the next half-cycle of the supply voltage, when the supply terminal 34 is at a positive polarity with respect to the supply terminal 32, current flows from the terminal 34 through the rectifier 98, the load 40, the load circuit rectifier 86 and the load winding 84, to the terminal 32. Such an action effects a substantially complete magnetic saturation of the magnetic core member 82, and during this same half-cycle of the supply voltage, the flux level in the magnetic core member 30 is reset to a predetermined value. Since the remaining operation of the magnetic amplifier 94 is similar to the operation of the magnetic amplifier 80 illustrated in Fig. 5, a further description of the opertion of the magnetic amplifier 94 is deemed unnecessary.

Figure 7:
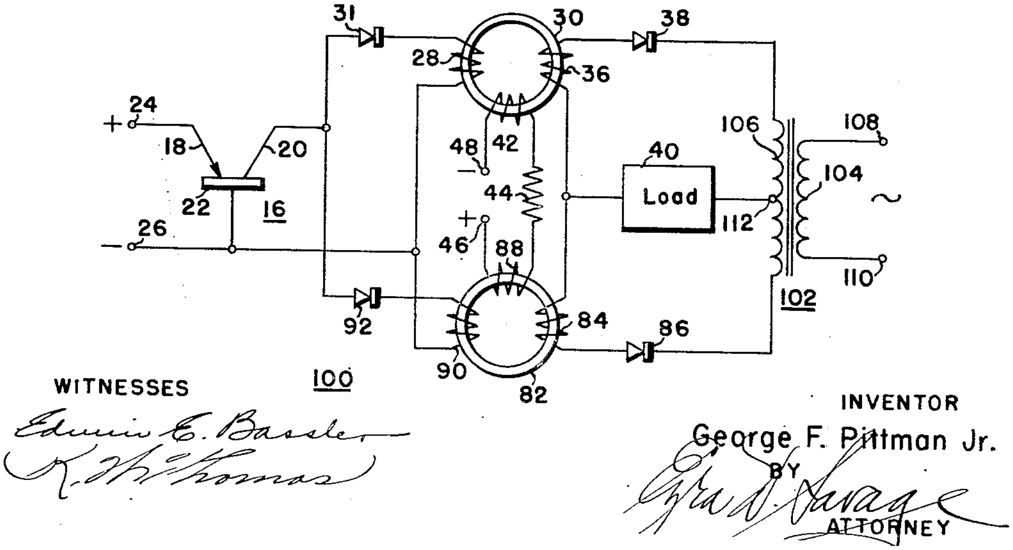
Fig. 7 is a schematic diagram of a center-tap, full-wave magnetic amplifier illustrating this invention.

Referring to Fig. 7, there is illustrated a center-tap type, full-wave magnetic amplifier 100 in which like components of Figs. 5 and 7 have been given the same reference characters. The main distinction between the magnetic amplifier 100 and the magnetic amplifier 80 is that in the magnetic amplifier 100 a transformer 102, having a primary winding 104 and a center-tapped secondary winding 106, is provided instead of applying the supply voltage directly to supply terminals 32 and 34, as illustrated in Fig. 5. In the magnetic amplifier 100, the supply voltage is applied to supply terminals 108 and 110 which are connected to the primary winding 104 of the transformer 102. As illustrated, the load 40 is interconnected between the junction point of the load windings 36 and 84 and the center-tap 112 of the secondary winding 106. On the other hand, the other end of the load winding 36 is connected to the upper end of the secondary winding 106, as shown, through the load circuit rectifier 38. The other end of the load winding 84 is connected to the lower end of the secondary winding 106, as shown, through the load circuit rectifier 86. It is to be noted that the load winding 84 of the magnetic amplifier 100 is wound oppositely from the load winding 84 of the magnetic amplifier 80. In addition, the load circuit rectifier 86 of the magnetic amplifier 100 is poled in the opposite direction from the load circuit rectifier 86 of the magnetic amplifier 80.

The operation of the apparatus of Fig. 7 will now be described. Assuming the upper end of secondary winding 106, as shown, is at a positive polarity with respect to its lower end, then current flows from the center-tap 112, through the load 40, the load winding 84, and the load circuit rectifier 86, to the lower end of the secondary winding 106, of the transformer 102. Such an action effects a substantially complete magnetic saturation of the magnetic core member 82. During this same half-cycle of the supply voltage, the magnetic core member 30 is being reset to a predetermined flux level. Of course, during this half-cycle of the supply voltage, when the upper end of the secondary winding 106, as shown, is at a positive polarity with respect to the lower end of the secondary winding 106, the load circuit rectifier 38 blocks the flow of current through the load winding 36.

During the next half-cycle of the supply voltage when the lower end of the secondary winding 106, as shown, is at a positive polarity with respect to the upper end of the secondary winding 106, current flows from the center-tap 112 through the load 40, the load winding 36, and the load circuit rectifier 38 to the upper end of the secondary winding 106. Such an action effects a substantially complete magnetic saturation of the magnetic core member 30, and during this same half-cycle of the supply voltage, the flux level in the magnetic core member 82 is reset to a predetermined value. Of course, during this half-cycle of the supply voltage, when the lower end of the secondary winding 106, as shown, is at a positive polarity with respect to the upper end of the secondary winding 106, the load circuit rectifier 86 blocks the flow of current through the load winding 84. Since the remaining operation of the magnetic amplifier 100 is similar to the operation of the magnetic amplifier 80, a further description of such operation is deemed unnecessary.

It is to be noted that the residual response time of the load or output circuits of the magnetic amplifiers illustrated in Figs. 1, 2, 3, 6 and 7 is one cycle. Since the transistor 16 incorporated in the magnetic amplifiers illustrmated in Figs. 1, 3, 6 and 7, and the transistor 60 incorporated in the magnetic amplifier of Fig. 2, function to cause the associated magnetic circuits to operate as fast as possible, the overall response time of these magnetic amplifiers, illustrated in Figs. 1, 2, 3, 6 and 7, is approximately one cycle. The residual response time of the load circuit of the magnetic amplifier of Fig. 5 is of the order of two or three cycles. Therefore, its overall response time is approximately two or three cycles.

Although the transistors hereinbefore described were either of the P-N-P junction type or of the N-P-N junction type, it is to be understood that a point contact transistor could be substituted for the transistors 16 and 60. The point contact type resistor could be substituted directly for the P-N-P junction-type resistor 16 since it has the same type of output. However, if a point contact type transistor is to be substituted for the N-P-N transistor 60, illustrated in Fig. 2, it would be necessary to reverse the polarity of the control winding 72.

The apparatus embodying the teachings of this invention has several advantages. For instance, the figure of merit of each of the magnetic amplifiers illustrated is higher than the prior art magnetic amplifiers. This is brought about by the particular manner in which the transistor is incorporated as a control element in the magnetic amplifier. In addition, the magnetic amplifiers described hereinbefore have a high speed of response and yet have a relatively high power gain. Further, each of the magnetic amplifiers described hereinbefore has a substantially linear output characteristic. It is also to be noted that for a given figure of merit the weight and size of each of the magnetic amplifiers described hereinbefore is substantially less than prior art magnetic amplifiers.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a magnetic amplifier for supplying energy to a load, the combination comprising, a transistor having an emitter, a collector, and a base, circuit means for applying a control voltage between the emitter and the base, magnetic core means, a control winding disposed in inductive relationship with the magnetic core means, the control winding being interconnected with the collector and base of the transistor so as to be responsive to the magnitude of said control voltage, a load winding disposed in inductive relationship with the magnetic core means, other circuit means responsive to an alternating-current supply voltage and interconnected with the load and with the load winding for effecting, during alternate half-cycles of said supply voltage, a substantially complete magnetic saturation of the magnetic core means, a biasing winding disposed in inductive relationship with the magnetic core means, and further circuit means, responsive to a substantially constant direct-current voltage and connected to the biasing winding, for effecting a resetting of the flux level in the magnetic core means to a predetermined flux level during the other alternate half-cycles of said supply voltage, to thereby induce a voltage across said control winding that functions as the supply voltage for the transistor, said predetermined flux level being determined by the difference in the flux produced in the magnetic core means by the current flow through the said control winding and through said biasing winding during said other alternate half-cycles.

2. In a magnetic amplifier for supplying energy to a load, the combination comprising, a transistor having an emitter, a collector, and a base, circuit means for applying a control voltage between the emitter and the base, magnetic core means, a load winding disposed in inductive relationship with the magnetic core means, other circuit means responsive to an alternating-current supply voltage and interconnected with the load and with the load winding for effecting, during alternate half-cycles of said supply voltage, a substantially complete magnetic saturation of the magnetic core means, a control winding disposed in inductive relationship with the magnetic core means, further circuit means, including a rectifier, for connecting said control winding to the collector and base of the transistor so that the said control winding is responsive to the magnitude of said control voltage and so that during said alternate half-cycles of said supply voltage current induced in the said control winding is prevented from flowing through the transistor, a biasing winding disposed in inductive relationship with the magnetic core means, and still further circuit means, responsive to a substantially constant direct-current voltage and connected to the biasing winding, for effecting a resetting of the flux level in the magnetic core means to a predetermined flux level during the other alternate half-cycles of said supply voltage, to thereby induce a voltage across said control winding that functions as the supply voltage for the transistor, said predetermined flux level being determined by the difference in the flux produced in the magnetic core means by the current flow through the said control winding and said biasing winding during said other alternate half-cycles.

3. In a magnetic amplifier for supplying energy to a load, the combination comprising, a transistor having an emitter, a collector, and a base, circuit means for applying a control voltage between the emitter and the base, magnetic core means, a load winding disposed in inductive relationship with the magnetic core means, other circuit means, including a rectifier, responsive to an alternating-current supply voltage and interconnected with the load and with the load winding for effecting, during alternate half-cycles of said supply voltage, a substantially complete magnetic saturation of the magnetic core means, a control winding disposed in inductive relationship with the magnetic core means, further circuit means, including another rectifier, for connecting said control winding to the collector and base of the transistor so that the said control winding is responsive to the magnitude of said control voltage and so that during said alternate half cycles of said supply voltage current induced in the said control winding is prevented from flowing through the transistor, a biasing winding disposed in inductive relationship with the magnetic core means, and still further circuit means, including a current limiting member, responsive to a substantially constant direct-current voltage and connected to the biasing winding, for resetting the flux level in the magnetic core means to a predetermined flux level during the other alternate half-cycle of said supply voltage, to thereby induce a voltage across the said control winding that functions as the supply voltage for the transistor, said predetermined flux level being determined by the difference in the flux produced in the magnetic core means by the current flow through the said control winding and said biasing winding during said other alternate half-cycles.

4. In a full-wave magnetic amplifier for supplying energy to a load, the combination comprising, a transistor having an emitter, a collector, and a base, circuit means for applying a control voltage between the emitter and the base, two magnetic core members, each of the magnetic core members having a control winding disposed in inductive relationship therewith, the control windings being interconnected with the collector and base of the transistor so as to be responsive to the magnitude of said control voltage, a load winding disposed in inductive relationship with each of said magnetic core members, other circuit means responsive to an alternating-current supply voltage and interconnected with the load and with the load windings for alternately energizing the said load windings, to thereby effect during one half-cycle of said supply voltage, a substantially complete magnetic saturation of one of said magnetic core members, and, during the other half-cycle of the said supply voltage, a substantially complete magnetic saturation of the other of said magnetic core members, a biasing winding disposed in inductive relationship with each of the said magnetic core members, and further circuit means responsive to a substantially constant direct-current voltage and connected to the biasing windings, for effecting a resetting of each of the said magnetic core members to a predetermined flux level during the respective half-cycle of the said supply voltage when the associated load winding is deenergized, to thus induce a voltage across each of said control windings which functions as the supply voltage for the transistor, said predetermined flux level in each of said magnetic core members being determined by the difference in flux produced in the respective magnetic core members by the associated control winding and biasing winding during that portion of the said supply voltage when the associated load winding is deenergized.

5. In a full-wave magnetic amplifier for supplying energy to a load, the combination comprising, a transistor having an emitter, a collector, and a base, circuit means for applying a control voltage between the emitter and the base, two magnetic core members, each of the magnetic core members having a load winding disposed in inductive relationship therewith, other circuit means responsive to an alternating-current supply voltage and interconnected with the load and with the load windings for alternately energizing said load windings, to thereby effect, during one half-cycle of said supply voltage, a substantially complete magnetic saturation of one of said magnetic core members, and, during the other half-cycle of the said supply voltage, a substantially complete magnetic saturation of the other of said magnetic core members, a control winding disposed in inductive relationship with each of the said magnetic core members, further circuit means, including a rectifier connected in circuit relationship with each of the control windings, for connecting the collector and base of the transistor to said control windings so that the said control windings are responsive to the magnitude of said control voltage and so that the current induced in the said control windings is prevented from flowing through the transistor, a biasing winding disposed in inductive relationship with each of the said magnetic core members, and still further circuit means, responsive to a substantially constant direct-current voltage and connected to the biasing windings, for effecting a resetting of each of the said magnetic core members to a predetermined flux level during the respective half-cycle of the said supply voltage when the associated load winding is deenergized, to thus induce a voltage across each of the said control windings which functions as the supply voltage for the transistor, said predetermined flux level in each of said magnetic core members being determined by the difference in flux produced in the respective magnetic core members by the associated control winding and biasing winding during that portion of the said supply voltage when the associated load winding is deenergized.

6. In a system for supplying energy to a load, in combination, a control voltage supply source, a transistor having an emitter, a collector and a base, the source of control voltage being connected across the emitter and base cooperative to render the transistor highly conductive when a control voltage is supplied, a magnetic core, means disposed on the magnetic core for conducting electric current and inducing magnetic flux in the core, a biasing voltage source, an alternating current voltage supply source, circuits connecting the transistor and control voltage source, the biasing voltage source and the load supply voltage source to the means on the magnetic core for inducing flux in the core, load terminals connected to the circuits to deliver a current in response to flux conditions in the core, and means connected in the circuits for protecting the transistor from excessive currents resulting from current flow from the supply voltage source.

7. In a system for supplying energy to a load, in combination, a control voltage supply source, a transistor having an emitter, a collector and a base, the source of control voltage being connected across the emitter and base cooperative to render the transistor highly conductive when control voltage is supplied, a magnetic core, means disposed on the core for conducting electric current and inducing flux in the core, a biasing voltage source, an alternating-current voltage supply source capable of driving the core to saturation during one-half cycle of current flow, supply circuits connecting the transistor and control voltage source, the biasing voltage source and the alternating-current voltage supply source to the means on the magnetic core for inducing flux in the core, the biasing voltage source serving to effect a resetting of the flux level in the core during the next half cycle, load terminals connected to the circuits to deliver a current in response to the flux conditions in the core, the flux level in the core during the next half cycle being dependent upon the biasing voltage source and the control voltage source, and rectifiers connected in the supply circuits to prevent the supply voltage source from effecting the flow of a substantial electrical current through the transistor during said next half cycle.

8. In a magnetic amplifier for supplying energy to a load, in combination, a power source for delivering a control voltage, a transistor having an emitter, a collector and a base, a power source for providing a control voltage being connected across the emitter and base cooperative to render the transistor highly conductive when a control voltage is delivered, magnetic core means disposed on the magnetic core for conducting electric current and inducing magnetic flux in the core, biasing voltage source, an alternating current voltage supply source capable of driving a core to saturation during one-half cycle of current flow, circuits connecting the transistor, the source of supply of control voltage, the biasing voltage source and the alternating current voltage supply source to the means on the magnetic core for inducing flux in the core, the biasing voltage source serving to effect a resetting of the flux level in the core during the next half cycle, load terminals connected to the circuits to deliver current in response to flux conditions in the core, the flux level in the core is during the next half cycle being dependent upon the biasing voltage source and the control voltage source, a rectifier connected in the circuit between the means for inducing flux in the core and the collector of the transistor and a second rectifier connected in the circuit between the alternating current voltage supply source and the means for inducing flux in the core, the rectifiers cooperating to protect the transistor from excessive current flowing from the alternating current voltage supply source on the said next half cycle.

References Cited in the file of this patent

UNITED STATES PATENTS 2,734,164 Knowlton ---------------- Feb. 7, 1956

OTHER REFERENCES

Publication entitled: Transistor-Controlled Magnetic Amplifier, by Richard H. Spencer, Electronics, August 1953.